US008414784B1

(12) United States Patent
Tsotsis

(10) Patent No.: US 8,414,784 B1
(45) Date of Patent: *Apr. 9, 2013

(54) THERMOPLASTIC-BASED, CARBON NANOTUBE-ENHANCED, HIGH-CONDUCTIVITY WIRE

(75) Inventor: Thomas K. Tsotsis, Orange, CA (US)

(73) Assignee: The Boeing Company, Chicago, IL (US)

(*) Notice: Subject to any disclaimer, the term of this patent is extended or adjusted under 35 U.S.C. 154(b) by 121 days.

This patent is subject to a terminal disclaimer.

(21) Appl. No.: 12/974,140

(22) Filed: Dec. 21, 2010

Related U.S. Application Data

(63) Continuation of application No. 12/348,595, filed on Jan. 5, 2009, now Pat. No. 7,875,801.

(51) Int. Cl.
*B82Y 40/00* (2011.01)

(52) U.S. Cl.
USPC ............. 216/13; 427/117; 427/118; 427/122; 427/202; 427/203; 427/402; 427/407.1; 977/842; 977/888; 977/890

(58) Field of Classification Search ........................ None
See application file for complete search history.

(56) References Cited

U.S. PATENT DOCUMENTS 6,988,925 B2 1/2006 Arthur et al.
7,118,693 B2 10/2006 Glatkowski et al.
7,378,040 B2 5/2008 Luo et al.
7,875,801 B2 * 1/2011 Tsotsis ........................ 174/126.1
7,875,802 B2 * 1/2011 Tsotsis ........................ 174/126.1
7,897,876 B2 * 3/2011 Tsotsis et al. .............. 174/126.1
7,931,828 B2 * 4/2011 Rice .............................. 252/511
2008/0044651 A1 * 2/2008 Douglas ........................ 428/339
2008/0286560 A1 11/2008 Huang et al.
2009/0035469 A1 2/2009 Sue et al.
2009/0117303 A1 * 5/2009 Goshiki ....................... 428/36.9
2009/0197082 A1 * 8/2009 Jiang et al. .................... 428/367
2009/0321687 A1 * 12/2009 Kim et al. ..................... 252/507
2010/0056012 A1 * 3/2010 Liu et al. ......................... 445/51
2010/0170694 A1 7/2010 Tsotsis
2010/0170695 A1 7/2010 Tsotsis
2010/0288981 A1 * 11/2010 Marcolongo et al. ......... 252/511
2011/0039064 A1 * 2/2011 Wani et al. .................... 428/137
2011/0147673 A1 * 6/2011 Gaillard et al. ............... 252/511
2011/0151254 A1 * 6/2011 Fugetsu et al. ................ 428/368
2011/0171469 A1 * 7/2011 Shah et al. .................... 428/395

FOREIGN PATENT DOCUMENTS

WO 2005119772 A2 12/2005
WO 2007024206 A2 3/2007
WO 2008076473 A2 6/2008

OTHER PUBLICATIONS

Palumbo, M. et al; Layer-by-Layer Thin Films of Carbon Nanotubes; Material Research Society; 2006; pp. 0901-Ra05-41-Rb05-41.1 to 0901-Ra05-41-Rb05-41.6; vol. 901E.
Loh, K. et al.; Multifunctional Layer-by-Layer Carbon Nanotube-Polyelectrolyte Thin Films for Strain and Corrosion Sensing; Smart Materials and Structures; 2007; pp. 429 to 439; vol. 16.

(Continued)

*Primary Examiner* — Anita Alanko
(74) *Attorney, Agent, or Firm* — Armstrong Teasdale LLP

(57) ABSTRACT

A conductive wire includes a plurality of thermoplastic filaments each having a surface, and a coating material having a plurality of carbon nanotubes dispersed therein. The coating material is bonded to the surface of each thermoplastic filament. The thermoplastic filaments having the coating bonded thereto are bundled and bonded to each other to form a substantially cylindrical conductor.

12 Claims, 3 Drawing Sheets

OTHER PUBLICATIONS

Sandler, J. et al.; Carbon-Nanofibre-filled Thermoplastic Composites; Materials Research Society; 2002; pp. 105 to 110; Vo. 706.

Zhao, Y. et al.; The Growth of Layer-by-Layer Aligned Carbon Nanotubes; IEEE; 2006; pp. 253 to 254.

Mamedov, A. et al.; Molecular Design of Strong Single-Wall Carbon Nanotube/Polyelectrolyte Multilayer Composites; Nature Materials; Nov. 2002; pp. 190 to 194; vol. 1; Nature Publishing Group.

* cited by examiner

THERMOPLASTIC-BASED, CARBON NANOTUBE-ENHANCED, HIGH-CONDUCTIVITY WIRE

CROSS REFERENCE TO RELATED APPLICATIONS

This application is a continuation application of application Ser. No. 12/348,595 filed Jan. 5, 2009, now U.S. Pat. No. 7,875,801, which is hereby incorporated by reference in its entirety.

STATEMENT REGARDING FEDERALLY SPONSORED RESEARCH & DEVELOPMENT

This invention was made with United States Government support under ATP/NIST Contract 70NANB7H7043 awarded by NIST. The United States Government has certain rights in the invention.

BACKGROUND

The field relates generally to fabrication of conductors, and more specifically to conductors that incorporate carbon nanotubes (CNTs) and the methods for fabricating such conductors.

Utilization of CNTs in conductors has been attempted. However, the incorporation of carbon nanotubes (CNTs) into polymers at high enough concentrations to achieve the desired conductivity typically increases viscosities of the compound containing the nanotubes to very high levels. The result of such a high viscosity is that conductor fabrication is difficult. A typical example of a high concentration is one percent, by weight, of CNTs mixed with a polymer.

Currently, there are no fully developed processes for fabricating wires based on carbon nanotubes, but co-extrusion of CNTs within thermoplastics is being contemplated, either by pre-mixing the CNTs into the thermoplastic or by coating thermoplastic particles with CNTs prior to extrusion. Application of CNTs to films has been shown, but not to wires.

Utilization of CNTs with thermosets has also been shown. However, thermosets are cross-linked and cannot be melted at an elevated temperature. Finally, previous methods for dispersion of CNTs onto films did not focus on metallic CNTs in order to maximize current-carrying capability or high conductivity.

The above mentioned proposed methods for fabricating wires that incorporate CNTs will encounter large viscosities, due to the large volume of CNTs compared to the overall volume of CNTs and the polymer into which the CNTs are dispersed. Another issue with such a method is insufficient alignment of the CNTs. Finally, the proposed methods will not produce the desired high concentration of CNTs.

BRIEF DESCRIPTION

In one aspect, a conductive wire is provided. The wire includes a plurality of thermoplastic filaments each comprising a surface, and a coating material having a plurality of carbon nanotubes dispersed therein. The coating material is bonded to the surface of each thermoplastic filament. The thermoplastic filaments are bundled and bonded to each other to form a substantially cylindrical conductor.

In another aspect, a method for fabricating a conductive polymer is provided. The method includes providing a plurality of thermoplastic filaments, applying a coating material to a surface of the filaments, along an axial length thereof, the coating material including carbon nanotubes dispersed therein, and melt-processing the coated filaments to bond the coating to the filaments.

In still another aspect, a method for fabricating a conductor is provided. The method includes applying a coating material that includes magnetically aligned carbon nanotubes to a plurality of thermoplastic filaments and heating the coated filaments to bond the coating material to the filaments.

DETAILED DESCRIPTION

The described embodiments seek to overcome the limitations of the prior art by placing carbon nanotubes (CNTs) on the outside of a polymer-based structure or other desired substrate to avoid the processing difficulties associated with dispersion of CNTs within the polymer before the structure is fabricated.

Figure 1:
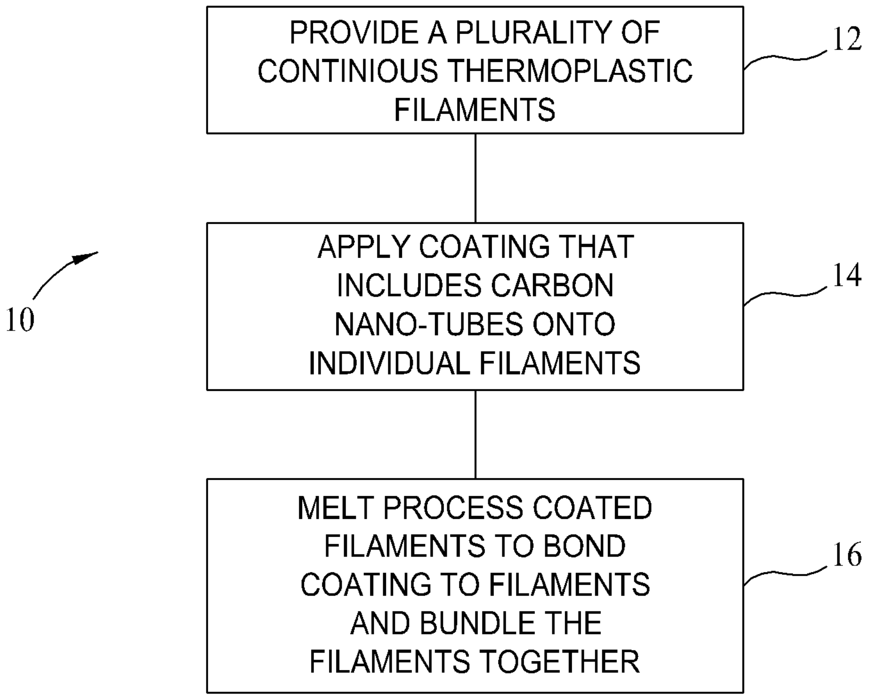
FIG. 1 is a flowchart illustrating a conductor fabrication process that incorporates carbon nanotubes.

One embodiment, illustrated by the flowchart 10 of FIG. 1, includes a method for producing high-conductivity electrical wires based on thermoplastics and metallic carbon nanotubes (CNTs). First, a plurality of continuous, thermoplastic, filaments are provided 12. A coating is applied 14 to the outer surface of the fine, continuous thermoplastic filaments. The coating includes the CNTs. The coated filaments are then melt-processed 16 to form CNT-enhanced, high-conductivity thermoplastic wires. The melt-processing 16 steps include bonding the coating to the individual filaments and bonding the filaments together into a bundle onto which an outer coating, such as wire insulation, can be applied.

The process illustrated by the flowchart 10 allows for high volume fractions of aligned carbon nanotubes to be applied to the surface of a thermoplastic to produce high-conductivity wires using a continuous process. Such a process avoids the necessity for having to mix nanoparticles and/or nanotubes into a matrix resin, since the combination of the two may result in a compound having an unacceptably high viscosity. Continuing, the high viscosity may make processing of the resulting compound difficult.

Figure 2:
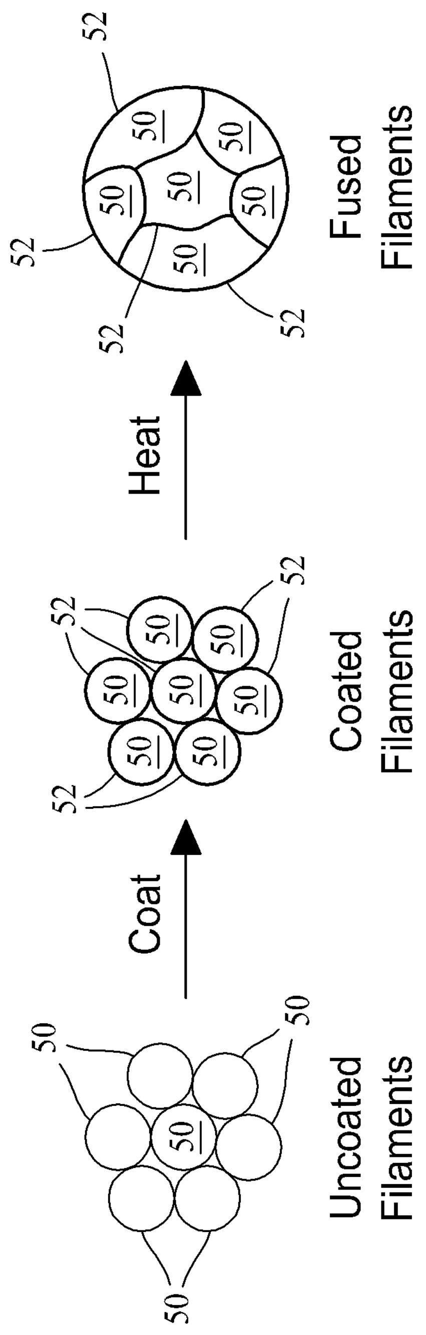
FIG. 2 is a series of cross-sectional diagrams further illustrating a conductor fabricated utilizing the process of FIG. 1.

FIG. 2 includes a series of cross-sectional diagrams further illustrating a conductor fabricated utilizing the process of FIG. 1. A plurality of individual, uncoated, thermoplastic filaments 50 are provided. Through coating, one method of which is further explained with respect to FIG. 3, the individual filaments 50 are coated with an outside layer 52 that includes the carbon nanotubes. The coated filaments 50 are then subjected to heating that bonds the coating 52 to the filaments 50 and further results in a bonding of the filaments 50 in a carbon nanotube-based conductor 60.

The described embodiments do not rely on dispersing CNTs into a resin as described by the prior art. Instead, CNTs are placed on the outside of small-diameter thermoplastic wires as described above. One specific embodiment utilizes only high-conductivity, single-walled, metallic CNTs to maximize electrical performance. Such an embodiment relies on very pure solutions of specific CNTs instead of mixtures of several types to ensure improved electrical performance. The concentrations levels of CNTs for coating are optimized for wire, in all embodiments, as opposed to concentrations that might be utilized with, or dispersed on, films, sheets and other substrates. Specifically, in a wire-like application, high strength is not required and high stiffness is not desirable.

Figure 3:
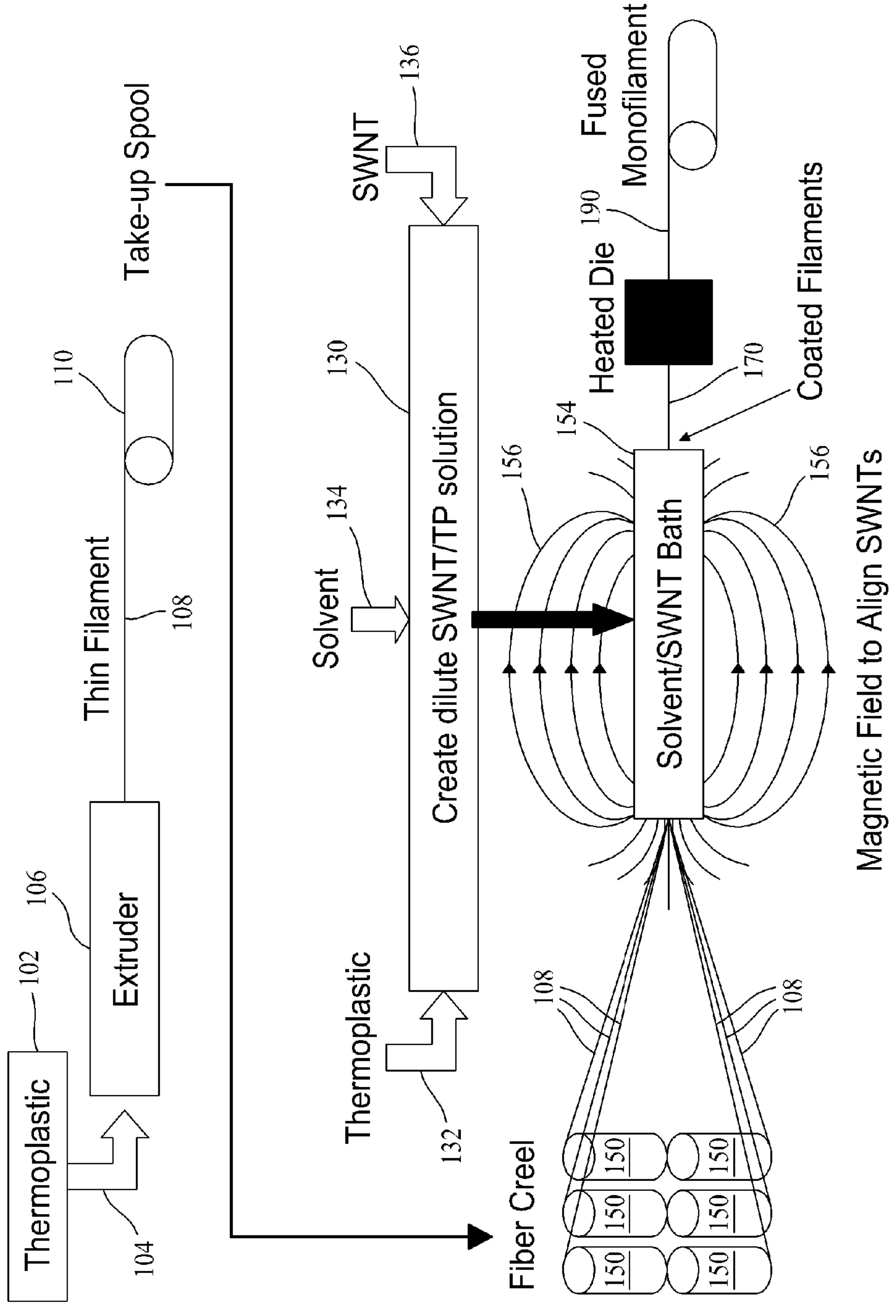
FIG. 3 is a block diagram that illustrates the individual components utilized in fabricating a carbon nanotube-based conductor.

FIG. 3 is a block diagram 100 that illustrates the individual components utilized in fabricating a carbon-nanotube-based conductor. As mentioned herein, coating methodologies are utilized to introduce sufficiently high concentrations of CNTs into polymeric materials for high-conductivity wire as opposed to previously disclosed methods that disclose the mixing of CNTs into a resin. It is believed the currently disclosed solutions are preferable because no current solution exists for making CNT-based wires, though some methods have been proposed, as described above.

Now referring specifically to FIG. 3, fabrication of the thermoplastic filaments is described. A thermoplastic material 102 is input 104 into an extruder 106 configured to output a thin filament 108 of the thermoplastic material which is gathered, for example, onto a take up spool 110.

In a separate process, a solution 130 is created that includes, at least in one embodiment, thermoplastic material 132, a solvent 134, and carbon nanotubes (CNTs) 136. The solution 130, in at least one embodiment, is an appropriate solution of CNTs 136, solvent 134, and may include other materials such as surfactants suitable for adhering to the outer surface of the small-diameter thermoplastic filaments. In one embodiment, the solution 130 includes one or more chemicals that de-rope, or de-bundle, the nanotubes, thereby separating single-walled nanotubes from other nanotubes.

To fabricate the above described conductor, separate creels 150 of individual thermoplastic filaments 108 are passed through a bath 154 of the above described solution 130. As the filaments 108 pass through the bath 154, a magnetic field 156 is applied to the solution 130 therein in order to align the carbon nanotubes 136. In a specific embodiment, which is illustrated, the CNTs 136 are single-walled nanotubes.

The magnetic field 156 operates to provide, at least as close as possible, individual carbon nanotubes for attachment to the filaments 108. The magnetic field 156 operates to separate the de-bundled CNTs into different types and works to extract metallic CNTs that have an "armchair" configuration, which refers to the CNT having a hexagonal crystalline carbon structure aligned along the length of the CNT. Such CNTs have the highest conductivity.

The embodiments represented in FIG. 3 all relate to a continuous line suitable for coating thin, flexible, polymeric strands (filaments 108) with a layer of the CNT solution 130 at a sufficient thickness to achieve a desired concentration or conductivity. The magnetic field 156, which may be the result of an electric field, is utilized to align the CNTs 136 in the solution 130 into the same direction as the processing represented in the Figure.

In one embodiment, the filaments 108 emerge from the solution 130 as coated strands 170 that may be gathered onto spools for post-processing into wire via a secondary thermoforming process. Alternatively, and as shown in FIG. 3, the coated strands 170 may be subjected to heating, for example, in a heated die 180 to make material suitable for twisting into wire 190. Finally, though not shown in FIG. 3, a suitable, flexible outer coating may be applied to the wire 190 and subsequently packaged in a fashion similar to that used for metallic wire.

This written description uses examples to disclose certain embodiments, including the best mode, and also to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for fabricating an electrical circuit using a conductor, said method comprising:

separating carbon nanotubes dispersed within a coating material into a plurality of types of carbon nanotubes based on a degree of conductivity, wherein the coating material is applied and bonded to a surface of at least one thermoplastic filament along an axial length thereof; and utilizing the carbon nanotubes within the coating material to conduct a current.

2. The method according to claim 1 wherein separating carbon nanotubes dispersed within a coating material comprises individually coating a bundled plurality of thermoplastic filaments with the coating material.

3. The method according to claim 1 wherein separating carbon nanotubes dispersed within a coating material comprises:

individually coating a bundled plurality of thermoplastic filaments with the coating material; and melt-bonding the bundled plurality of thermoplastic filaments together.

4. The method according to claim 1 wherein separating carbon nanotubes dispersed within a coating material comprises extracting a portion of the carbon nanotubes dispersed within the coating material, the portion including carbon nanotubes having a hexagonal crystalline carbon structure.

5. The method according to claim 4 wherein extracting a portion of the carbon nanotubes dispersed within the coating material comprises extracting the portion of the carbon nanotubes axially aligned along the length of the at least one thermoplastic filament.

6. The method according to claim 1 wherein separating carbon nanotubes dispersed within a coating material comprises providing the coating material with a sufficient thickness to achieve a desired concentration of carbon nanotubes therein.

7. A method for fabricating an electrical circuit using a conductor, said method comprising:

providing at least one thermoplastic filament that includes a surface having a coating material applied and bonded thereto along an axial length of the at least one thermoplastic filament, the coating material including carbon nanotubes dispersed therein; and utilizing the carbon nanotubes within the coating material to conduct a current.

8. The method according to claim 7 further comprising individually coating the at least one thermoplastic filament with the coating material.

9. The method according to claim 7 further comprising melt-bonding the at least one thermoplastic filament.

10. The method according to claim 7 further comprising extracting a portion of the carbon nanotubes dispersed within the coating material, the portion including carbon nanotubes having a hexagonal crystalline carbon structure.

11. The method according to claim 10 wherein extracting a portion of the carbon nanotubes dispersed within the coating material comprises extracting the portion of the carbon nanotubes axially aligned along the length of the at least one thermoplastic filament.

12. The method according to claim 7 further comprising providing the coating material with a sufficient thickness to achieve a desired concentration of carbon nanotubes therein.

* * * * *